Nov. 25, 1969          W. T. RENTSCHLER          3,480,860
TESTING MEANS FOR AN ELECTRONICALLY OPERATING AUTOMATIC
EXPOSURE SYSTEM FOR PHOTOGRAPHIC CAMERAS
Filed May 19, 1965
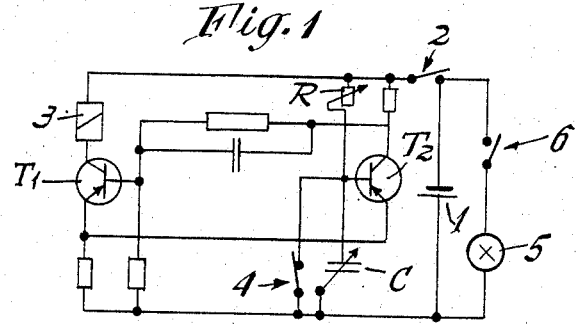
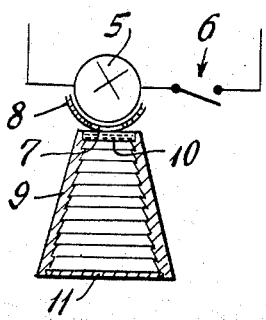
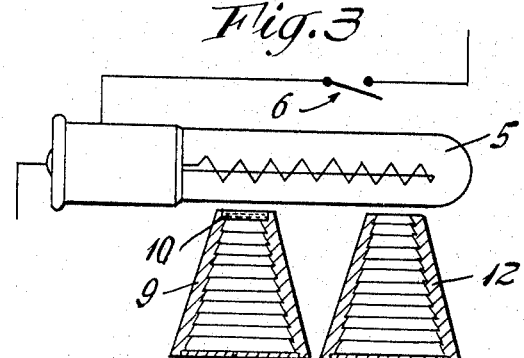
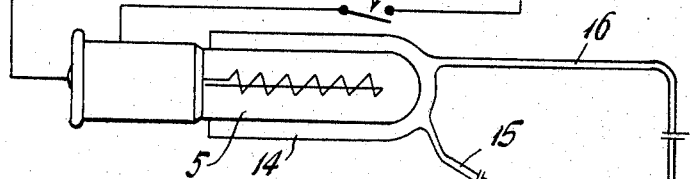
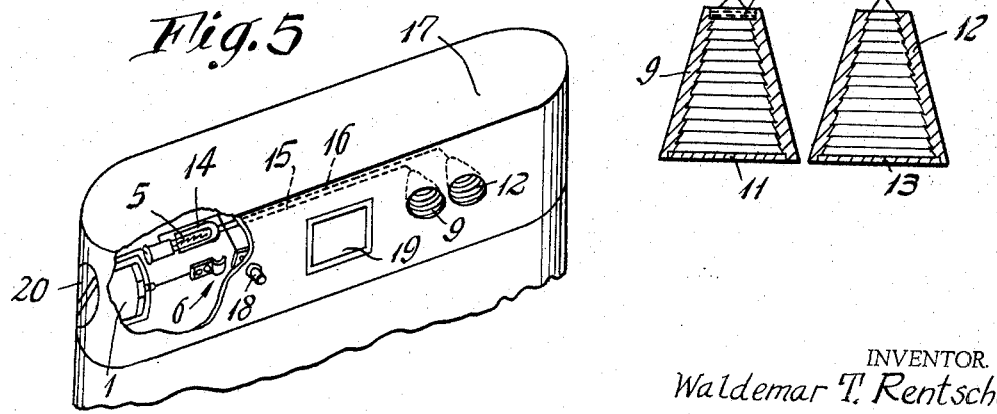
INVENTOR.
Waldemar T. Rentschler
BY
Arthur A. March
ATTORNEY

United States Patent Office 3,480,860
Patented Nov. 25, 1969

3,480,860
TESTING MEANS FOR AN ELECTRONICALLY OPERATING AUTOMATIC EXPOSURE SYSTEM FOR PHOTOGRAPHIC CAMERAS
Waldemar T. Rentschler, Calmbach, Germany, assignor to Prontor-Werk Alfred Gauthier, G.m.b.H., Calmbach (Enz), Germany, a corporation of Germany
Filed May 19, 1965, Ser. No. 457,015
Int. Cl. G01r 31/02
U.S. Cl. 324—96                    2 Claims

ABSTRACT OF THE DISCLOSURE

An automatic exposure system for a photographic camera is provided with a battery, a test bulb and a switch to connect the bulb to the battery in order to indicate the voltage of the battery by the intensity of the light produced by the bulb. In addition reference is provided to receive light from the bulb and to transmit the light for observation.

---

The present invention relates to an electronically-operated, battery-powered, automatic exposure system for photographic cameras.

The present invention includes a control device for the capacity state of the battery that supplies current to the electronic exposure system. This control device is of simple construction, which allows flexibility of operation and freedom of choice and, in addition, requires little space for installation and adds only a small amount to the cost.

The capacity of the battery for an electronic automatic exposure system determines the accuracy of the exposure control or regulating values obtained, although these are not influenced by the fluctuations of the battery voltage within certain limits. The lower limit of the admissible fluctuations is in the vicinity of about 50% to 60% of the voltage of a new battery. This means that the automatic system produces sufficiently satisfactory results, as long as the voltage of the battery is within the above-mentioned range. If the battery voltage drops below the limit of 50% to 60%, the battery is unable to supply the operating power for an electronic automatic system, and the exposure results obtained with a battery weakened to such an extent are useless.

Consequently, the photographer who intends to take photographs with a camera equipped with an electronically-operated automatic exposure setting should know whether the battery of the device for controlling the automatic system is ready for operation, i.e., whether there is a sufficient voltage to ensure proper working of the automatic system. In a known camera of the above-described species, this can be determined only after the exposure has been effected by evaluating the picture that has been taken. If the picture has not been properly exposed although the camera has been operated correctly, it may be assumed that the capacity of the battery has dropped to a value which no longer insures satisfactory operation of the automatic exposure system. This method of determining the condition of the battery by way of the finished picture is unsatisfactory and expensive. In many instances the particular situation which the photographer wanted to record cannot be repeated after it is discovered that the automatic exposure system resulted in a wrong setting of the exposure factors because the voltage was too low. In addition, the loss of a picture caused by the incorrect exposure with the automatic exposure system means an unnecessary expense, which is often comparatively costly, depending on the kind of film used.

Also known in the art is a camera with electronic automatic exposure system, which comprises, in addition to the electronic timing device, a rotating-coil measuring mechanism. On the one hand, this measuring mechanism indicates the exposure time to be expected during the exposure, and on the other, the measuring mechanism makes it possible to determine the condition of the battery. However, the use of such a rotating-coil measuring mechanism adds to the price of the camera and occupies a comparatively large space. This largely counterbalances the advantages which are supposed to result from the use of an electronic automatic exposure system when compared with the use of an automatic system comprising a rotating-coil measuring mechanism.

The present invention, which substantially overcomes the above-mentioned disadvantages includes a test bulb that can be connected to the battery in order to determine the condition of the battery. This offers the advantage that the photographer is able to determine, prior to carrying out the exposure, whether the battery of the automatic exposure system still has a voltage which ensures proper working of the automatic device. Having connected the battery to the test bulb, the photographer merely needs to observe the bulb briefly to determine the condition of the battery. The light intensity of the test bulb then makes it possible to judge in a simple and sufficiently dependable manner whether the battery voltage is still within a satisfactory voltage range to permit the automatic exposure system to produce good exposure results, which is the case as long as the voltage of the battery has not dropped below about 50% and 60% of the voltage value of the battery when new.

In order to make the determination of the voltage of the battery as objective as possible and to remove the subjective judgment of the operator, the invention includes means associated with the test bulb to represent a reference basis with respect to the light intensity of the bulb as developed by the battery charge. One suitable embodiment for obtaining an objective reference includes a gray filter placed in a blackened observation funnel to be irradiated by light from the test bulb. The density of the filter is selected so that the light rays from the bulb can just penetrate it at the lower limit of the battery charge. This measurement can be obtained comparatively simply and inexpensively and without any appreciable demands on the photographer insofar as handling the control device is concerned.

Another feature of the invention is a second observation funnel associated with the test bulb and with the first blackened observation funnel and gray filter referred to here and above. The second funnel is also blackened on the inside and is arranged so that light from the bulb can pass through it without obstruction. This permits the photographer to see whether the bulb is lighted even when it is no longer visible through the gray filter.

A further feature of the invention lies in the provision of a fiber optic system between the test bulb and the observation funnels, thus allowing for a certain flexibility of arrangement of the parts within the camera.

The invention will be described in the following specification together with the drawings in which:

FIG. 1 is a wiring diagram of an electronically operated automatic controlling system in conjunction with the circuit of a test bulb and a battery;

FIG. 2 is an end view of the test bulb of FIG. 1 together with a cross sectional view of one of the observation funnels;

FIG. 3 is a side view of the test bulb of FIG. 2 together with cross sectional views of two observation funnels;

FIG. 4 shows another arrangement of the bulb funnels of FIG. 3 together with a fiber optic system to transmit light from the bulb to both of the funnels; and FIG. 5 is a perspective view of a portion of a camera including the apparatus of FIG. 4 with parts of the camera broken away to illustrates the interior construction thereof.

The wiring diagram of FIG. 1 shows a battery 1, which is the power supply for an electric timing device built into a camera. This device includes a known delay circuit including a resistor and a capacitor. The delay circuit can be connected to the battery 1 by a contact switch 2 to be actuated by a camera release member, or shutter trigger, not shown in the drawing. An electromagnet 3 is connected in series with the battery and switch and with the emitter-collector circuit of a transistor $T_1$. The electromagnet 3 is associated with a locking device which is not shown in FIG. 1 and which is provided for the purpose of temporarily blocking the driving mechanism of the shutter blades in the open position of the latter. The shutter blades referred to are typical shutter blades for a photographic camera and are therefore not shown in the drawing. A second circuit includes a second contact switch 4 along with a capacitor C connected with a second transitor $T_2$ and an adjustable resistor R. The resistor R and the capacitor C form the heart of the delay circuit which determines how quickly the shutter will be closed against after it has been opened. The remainder of the circuit in FIG. 1 consists of additional resistors and a capacitor interconnected with the above mentioned components to form a complete timing circuit.

In order to permit the photographer to examine the state of charge of the battery 1 prior to taking a photograph, the invention includes an indicating device connected to the battery. This device includes a test bulb 5 in series wth a switch 6 to permit the bulb to be connected for a brief interval of time directly across the battery 1. For this purpose the switch 6 may be in the form of a push button. When the switch 6 is closed, the bulb 5 lights up and the intensity of illumination offers an indication of the voltage of the battery. Preferably the test bulb is a miniature filament bulb so as to cause only a very small drain on the battery 1 when it is connected thereto.

The components necessary for evaluating the state of charge of the battery 1 are shown in somewhat more detail in FIGS. 2–5. These elements include a screen 8, which is shown in FIG. 2, and which is shaped so as to fit around the bulb 5. This screen is provided with an opening 7 and is located near the constricted end of a funnel, or cone 9 with a specific minimum depth. A gray filter 10 is located at the constricted end of the funnel adjacent to the bulb 5. The density of the filter is such that light from the bulb 5 will be transmitted through the filter 10 in sufficient intensity to be visible to one looking into the larger end of the funnel if the battery voltage is above a minimum level. A cover glass 11 is provided across the large end of the funnel to prevent dirt particles from entering the funnel, and the inner surface of the funnel is blackened to eliminate the disturbing influence of extraneous light when looking at the test bulb 5.

The gray filter 10 enables the photographer to decide relatively easily whether or not the battery in his camera still has sufficient voltage to permit normal operation of the shutter. All that the photographer needs to do is to close the switch 6 for a moment and then to determine, by looking into the funnel 9, whether any light from the test bulb is visible through the filter 10. If it is, the battery 1 has a high enough voltage to operate the automatic exposure system properly. However, when the battery voltage diminishes to a point at which light from the test bulb 5 can no longer pass through the filter 10 when the switch 6 is closed, a new battery should be substituted for the old one.

The control device shown in FIG. 3 includes, in addition to the funnel 9 with the gray filter 10 and the covering glass 11, a second observation funnel, or cone, 12 which is also placed so that light from the test bulb 5 can shine through it. The second funnel 12 does not have a gray filter but it does have a cover glass 13 at its larger, or viewing, end. Thus light from the bulb 5 is not attenuated in passing through the funnel 12 so that if the bulb 5 produces any light at all it will be possible to see it through the funnel 12, thus establishing that the apparatus is in working order. Then if no light passes through the filter 10, so far as the photographer can observe, the photographer can conclude that the battery voltage has dropped below the minimum operating level. On the other hand, if no light passes through the funnel 12 when the switch 6 is closed, the photographer can conclude that either the bulb 5 must be replaced or that the battery 1 has dropped to a very low charge level. The photographer may then substitute a new battery and if there is still no light from the bulb 5 he can conclude that it is the bulb 5 that has ceased to operate.

The funnels 9 and 12 shown in FIGS. 2 and 3 are mounted directly adjacent to the test bulb 5. However, such an arrangement may not be convenient in a camera because it may interfere with location of other components. The funnels 9 and 12 must be located where they can be easily viewed by the photographer, but convenience of arrangement of the internal components of the camera may require the bulb to be located some distance away. These factors, which appear to be mutually inconsistent, may be resolved by providing light channels from the bulb 5 to the funnels 9 and 12. These are shown in FIG. 4 in which the bulb 5 is surrounded by a screen 14 to which two light conducting channels or filaments 15 and 16 are connected. These channels may be in the form of fiber optics. The fiber optic filament 15 transmits light from bulb 5 to the funnel 9, while the filament 16 conducts the light from bulb 5 to the funnel 12, thus permitting the bulb to be located some distance from the funnels 9 and 12.

FIG. 5 shows a practical embodiment of the invention including the fiber optic filaments 15 and 16 of FIG. 4. In FIG. 5 the battery 1 is in the form of a button-type cell and is arranged, along with the bulb 5, in the covering cap 17 of the camera. The contact switch 6 has a spring loaded push button 18 which can be actuated from outside the camera. According to FIG. 5 the two observation funnels 9 and 12 are arranged adjacent to each other and adjacent to the view finder 19 of the camera and receive light from the bulb 5 by way of the fiber optic filaments 15 and 16. A screw cap 20 is inserted into the covering cap 17 to provide access to a space within which the battery 1 and the test bulb 5 are located.

What is claimed is:

1. In an automatic exposure system for a photographic camera, which includes a battery; a testing system comprising a test bulb; a switching circuit connecting said bulb to said battery to permit said battery to actuate said bulb to produce illumination having an intensity determined by the voltage of said battery; a first observation funnel having a blackened inner surface, a gray filter located at the constricted end of said funnel to receive light from said bulb and to transmit a detachable intensity of light through said filter only when the voltage of said battery exceeds a predetermined level; and a second funnel having a blackened interior and located to receive light from said bulb and to transmit said light at any intensity level to indicate whether said bulb and battery are operating at all.

2. In an automatic exposure system for a photographic camera, which includes a battery; a testing system comprising a test bulb; a switch to connect said battery to said bulb to produce illumination of an intensity determined by the voltage of said battery; an observation funnel having a blackened interior surface; a gray filter adjacent to the constricted end of said funnel; and a fibre optic system between said bulb and said filter to transmit light from said bulb to said filter whereby said light can be observed if the intensity thereof is sufficient to permit it to pass through said filter and comprising in addition a second observation funnel and a second fibre optic means connecting said bulb to said second funnel to transmit light from said bulb through said second funnel substantially without reduction in intensity to provide means for determining whether said bulb is producing any illumination at all.

References Cited

UNITED STATES PATENTS

| | | | |
|---|---|---|---|
| 896,300 | 8/1908 | Jarvis | 324—29.5 |
| 1,879,098 | 9/1932 | Coffey | 324—29.5 |
| 2,741,737 | 4/1956 | Gage et al. | 324—24 |
| 2,765,440 | 10/1956 | Adelman et al. | 324—20 |
| 2,971,432 | 2/1961 | Blank | 352—171 |
| 3,290,593 | 12/1966 | Crowdes | 324—96 |
| 3,333,184 | 7/1967 | Adelman et al. | 324—20 |

OTHER REFERENCES

German printed application No. 1,160,229, Dec. 27, 1963, 2 pp.

RUDOLPH V. ROLINEC, Primary Examiner

C. F. ROBERTS, Assistant Examiner

U.S. Cl. X.R.

324—29.5; 350—96